United States Patent [19]

Forsythe

[11] 4,264,639
[45] Apr. 28, 1981

[54] STEAROYL LACTYLATE SALT COMPOSITION HAVING IMPROVED PHYSICAL PROPERTIES AND METHOD OF PRODUCTION

[75] Inventor: Curtis J. Forsythe, Raytown, Mo.

[73] Assignee: Top-Scor Products, Inc., Kansas City, Kans.

[21] Appl. No.: 888,224

[22] Filed: Mar. 20, 1978

[51] Int. Cl.$^3$ ............................................. A21D 2/16
[52] U.S. Cl. .................................................... 426/653
[58] Field of Search ................ 426/653, 607, 611, 99, 426/654

[56] References Cited

U.S. PATENT DOCUMENTS

| | | | |
|---|---|---|---|
| 2,789,992 | 4/1957 | Thompson et al. | 260/410.9 R |
| 3,033,686 | 5/1962 | Landfried et al. | 426/653 |
| 3,180,736 | 4/1965 | Landfried . | |
| 3,244,534 | 4/1966 | Buddemeyer et al. . | |
| 3,494,771 | 2/1970 | Thompson | 426/23 |
| 3,535,120 | 10/1970 | Bonchard et al. . | |
| 3,773,521 | 11/1973 | Tsen et al. | 426/25 X |
| 3,803,326 | 4/1974 | Craig et al. | 426/653 X |
| 3,806,604 | 4/1974 | Kozak | 426/653 |
| 3,870,799 | 3/1975 | Tenny | 426/62 |
| 3,876,805 | 4/1975 | Craig et al. | 426/23 |
| 3,883,669 | 5/1975 | Tsen et al. | 426/549 |
| 3,886,293 | 5/1975 | Zech | 426/653 |
| 3,914,452 | 10/1975 | Norris | 426/654 X |
| 3,919,434 | 11/1975 | Tsen et al. | 426/553 |

*Primary Examiner*—Esther M. Kepplinger
*Attorney, Agent, or Firm*—Fishburn, Gold & Litman

[57] ABSTRACT

A stearoyl lactylate salt composition and method of production thereof wherein the composition has improved handling and storage characteristics. The lactylate salt is thermally mixed with from about 2% to about 30% (by weight) of hydrogenated stearin which has from about 50% to 100% (by weight of fatty acid) $C_{18}$ fatty acid and an iodine value of less than 7.

1 Claim, No Drawings

STEAROYL LACTYLATE SALT COMPOSITION HAVING IMPROVED PHYSICAL PROPERTIES AND METHOD OF PRODUCTION

This invention relates to stearoyl lactylate salt compositions, and method of production thereof, which compositions are surprisingly low in hygroscopicity and relatively high in softening and melting points. More particularly, this invention relates to thermally mixed compositions comprising from about 70% to about 98% by weight of stearoyl lactylate salts, especially stearoyl-2-lactylate salts, and from about 2% to about 30% by weight of stearin.

Stearoyl lactylate salts have been sold in commerce for many years, being used especially, in the edible forms, as additives in bakery products to improve quality. Sodium and calcium stearoyl-2-lactylates are the most common and commercially used of the salts and their addition to products for human consumption is controlled by the United States Food and Drug Administration as set forth in Food Additive Regulation 21 CRF Section 172.846 and 172.844 respectively, and also in 21 CFR Section 136.110, in particular subsection C-15.

As used herewithin, the terms sodium and calcium stearoyl lactylate refer to both the laboratory produced and commercial grades of each stearoyl lactylate salt. The commercial grade stearoyl lactylate salts, while controlled in food products as described above, actually encompass a variety of lactylates including those having a wide range of lactyl groups and various fatty acids taken from the acyl group. For example, the stearoyl lactylate salts are generally written as sodium stearoyl-m-lactylate and calcium stearoyl-n-lactylate wherein m and n represent the average number of lactyl groups (polylactyls) present, that is, each m and n represents an average of a range which may extend from 0 to 11 when used as baking additives. Lactylates having 1 to 3 lactyl groups are considered most functional in baking with an average of 2 preferred. In normal nomenclature each m and n is rounded to the nearest whole number, hence, 2 may actually represent a range of 1.51 to 2.50. As used herein a non-decimaled number, such as 2, references a range whereas a decimaled number, such as 2.0 references a specific average number. In addition, commercial grade stearoyl lactyls may contain a wide range of acyl fatty acid radicals, including those of $C_{14}$ to $C_{22}$ fatty acids, the most common of which are $C_{18}$ and $C_{16}$ fatty acids. Thus, for example, a particular stearoyl lactylate may be made from stearin fatty acid containing 50% stearic acid and 50% palmetic acid. Therefore as used herein, stearoyl lactylate salts are understood to include the wide range of lactyl groups and various fatty acids substitutions for stearic acid which may be present in commercial stearoyl lactylate salts.

Although the sodium and calcium stearoyl lactylates are the most common of the stearoyl lactylate salts, salts of other metals may be produced according to the present intention, especially stearoyl lactylate salts of the alkali and alkaline earth metals. One example of such a salt is potassium stearoyl lactylate, which is non-toxic and may be produced according to the present invention, but which is not presently approved for use as a food additive.

Conventional methods of manufacture of sodium and calcium stearoyl lactylate salts are well known and an example of such is given in Tsen et al U.S. Pat. No. 3,883,669.

The conventional stearoyl lactylate salts are characterized by their relatively low softening and melting points and are normally highly hygroscopic, particularly the sodium salt, which will be shown below. Such salts are often used, especially in the baking industry, as powders such that 100% of the powder will pass through U.S. 40 mesh screen. The low melt and high hygroscopicity characteristics of such compositions present serious storage and warehousing problems, particularly in summer months because of the tendency for the powdered materials to coalesce into lumps and hard cakes. Storage costs are increased because of special care required, and if the salts do become caked they normally can no longer be used and must be either scrapped or returned to the manufacturer for additional processing. The manufacturers of such salts thus suffer from poor customer relations generated by such caking.

Therefore, the principal objects of the present invention are: to provide stearoyl lactylate salt compositions which have higher melting and softening points than conventional stearoyl lactylate salts; to provide such stearoyl lactylate salt compositions which are less hygroscopic than conventional stearoyl lactylate salts; to provide a method for manufacture of higher melting and lower hygroscopic stearoyl lactylate salts; and to provide such stearoyl lactylate salt compositions which are convenient to handle, economical to use and particularly well suited for their proposed use.

Other objects and advantages of this invention will become apparent from the following description wherein is set forth by way of example, certain embodiments of this invention.

As required, detailed embodiments and examples of the present invention are disclosed herein. However, it is to be understood that the disclosed embodiments and examples are merely exemplary of the invention which may be embodied in many various forms. Therefore, specific details disclosed herein are not to be interpreted as limiting but merely as a basis for the claims and as a representative basis for teaching one skilled in the art to variously employ the present invention.

The present invention is based on the unique and surprising discovery that the thermal mixing of hydrogenated stearin with stearoyl lactylate salts advantageously increases the melting and softening points and reduces the hygroscopicity of such salts beyond what would be expected.

As used herein the term stearin refers to fully hydrogenated fats and oils, that is such stearin having an iodine value of less than 7, wherein a minimum of 50% of fatty acid radicals thereon (by weight of fatty acid) is $C_{18}$ fatty acid. This terminology generally agrees with commercial practice. It is understood that the term fat refers to triglycerides which are solid or semisolid at normal ambient temperatures and oil refers to triglycerides which are liquid at such temperatures. Thus, as used herein, stearin may include a wide variety of triglycerides whose individual fatty acids may range from $C_{12}$ to $C_{24}$, the most common (besides $C_{18}$ stearic acid) being $C_{16}$ palmetic acid. It is also understood that stearin may include amounts of free fatty acid as are found in commercial grades thereof. It has been found that the most functional stearin for the present invention are those having high percentages of $C_{18}$ stearic acid. Thus hydrogenated soybean oil stearin, having fatty acids which are in the nature of 90% (by weight of fatty acid)

C₁₈ stearic acid is very functional. Many other vegetable and animal oils stearins (such as those of corn oil, cottonseed oil, herring oil, lard, olive oil, palm oil, peanut oil, rapeseed oil, safflower oil, sardine oil, sunflower oil, tallow, or mixtures thereof) are also functional, however, as the percentage of less than $C_{18}$ fatty acids increases, functionality decreases. Herring oil, rapeseed oil, and sardine oil have more than 50% of at least $C_{18}$ fatty acid and are composed of fatty acids of which a majority are greater than $C_{18}$ in length. Hence fully saturated animal tallow having about 50% $C_{18}$ stearic fatty acid and 50% $C_{16}$ palmetic fatty acid is less functional than soybean oil stearin. For stearoyl lactylate salts used in food products, edible stearins are utilized, however, the non-edible stearins are also functional in the practice of the present invention.

The term thermal mixing as used herein refers to addition of the stearin to the stearol lactylate salt formulation at temperatures above ambient, and preferably while the stearoyl lactylate salt is in a molten state. The stearin may be thermally mixed during any or all of the conventional process steps of manufacture of stearoyl lactylate salts; while such salts are still molten as described, after the completion of the salt while still molten from manufacture, or added to such salts which have been remelted into the molten state. It appears preferential to add the stearin in the first step of production of such salts, wherein the stearic acid and lactylic acid are mixed and an esterification reaction occurs between the acids, as the stearin helps control foaming, thereby facilitating manufacture.

The term co-melted as used herein when referring to stearin addition is understood to mean that the previously manufactured and cooled lactylate salt is remelted, and during or after such remelting, while still in a molten state, the stearin is added and mixed therewith. Also as used herein the term thermally co-mixed when used in reference to stearin is understood to mean that the stearin is added to and mixed with the lactylate salt during production of same while the lactylate salt is still in a molten state resulting from production and before cooling.

SUMMARY

It has been discovered that stearoyl lactylate salts can be produced with improved handling and storage properties as measured by hygroscopicity, resistance to humidity and increase in melting or softening point by the thermal addition of hydrogenated stearin to such salts. The most functional stearins are those having high percentages of $C_{18}$ fatty acid, although those having as low as about 50% (by weight of fatty acid) $C_{18}$ fatty acid are functional. The most functional commercial stearin would seem to be hydrogenated soybean oil stearin. Other stearins such as palm oil or cottonseed oil stearin are also functional. The stearin preferably should be fully hydrogenated, having an iodine number of less than 7.

As little as about 2% (by weight) edible stearin is functional in the present invention. At about 30% (by weight) edible stearin, the cost of further stearin addition outweighs benefits derived therefrom, however, higher percentages of stearin are functional. An optimum percentage of stearin addition should be based upon a current cost verses benefit analysis for each situation.

The stearoyl lactylate salt may be that of sodium, calcium, other alkaline earth or alkali metals, or mixtures thereof. The salt must be acceptably non-toxic if it is to be used in food products.

The present invention is functional with stearoyl lactylate salts having a wide range of polylactyls, although stearoyl-2-lactylate salt is preferred, is functional in any of the commercial stearoyl lactylate salts which may comprise a variety of acyl fatty acids radicals, and is not limited to stearic fatty acid.

The practice of the present invention includes the production of stearoyl lactylate salts by any of the conventional methods, with the hydrogenated stearin, as previously described, being thermally mixed with the stearoyl lactylate salt in amounts of about 2% to about 30% by weight. This thermal mixing may occur when such salts are originally produced (thermally co-mixed) while still molten or at a later time when such salts are remelted to a molten state and the stearin is added during or immediately proceeding such melting and then both are thoroughly mixed (thermally co-melting). The resultant stearoyl lactylate salts are cooled and powdered.

The examples which follow will serve to illustrate the preparation of several stearoyl lactylate salts according to this invention and the benefits derived therefrom.

In all of the following examples the pulverized laboratory preparations and the commercial compositions were passed through a U.S. Standard 200 mesh seive, in order to control particle size, before testing.

The following three tests were carried out on each stearoyl lactylate produced according to each of the examples:

(1) Degree of Hygroscopicity—A standard volume portion of each salt powder was exposed to normal room humidity at 70° Fahrenheit (F) for a standard period of time. Each sample was then subjectively tested for hygroscopicity as demonstrated by stickiness and crust formation. An extreme rating was given for heavy crusting and/or stickiness. A slight rating showed very little crusting and/or stickiness. An extreme rating is considered undesirable.

(2) Resistance to Caking at 110° F.—A standard volume portion of each salt powder was placed in a sealed container and stored for a standard period of time at 110° F. Each sample was then subjectively tested for caking as demonstrated by loss of powdered character and/or formation of a solid lump. A rating of extremely poor signifies very heavy caking and is considered undesirable. A rating of very good signifies little or no caking.

(3) Melting Point Range F.°—The melting point of individual samples of each salt was determined using a Fisher Digital Melting Point Avalyzer Model #355 in degrees F. The results of several tests run on each salt were reported as a range indicating the beginning and end of the melting process required to obtain a clear melt. A high relative melting point is considered desirable.

EXAMPLE I

A sample of Emplex (a commercial brand of sodium stearoyl-2-lactylate produced by the C. J. Patterson Co.) was tested as described above. A sample of sodium stearoyl-2-lactylate (SS2L) was prepared by conventional methods in the laboratory without any additions. Three additional samples of sodium stearoyl-2-lactylates were also prepared in the lab wherein hydrogenated soybean oil stearin, having an iodine value of less than 7 and a melting point range of 147.7° to 151.3° F.

was added to the reaction charge at the same time as the stearin fatty acid in amounts of 2.5%, 10% and 30% (by weight) in each sample respectively. These laboratory preparations were powdered and tested as described above. All test results are recorded in Table I.

TABLE I
COMPARISON OF THE PHYSICAL PROPERTIES OF SODIUM-2 LACTYLATE WITH AND WITHOUT HYDROGENATED SOYBEAN OIL STEARIN IN THE REACTION PRODUCTS AND AS A FUNCTION OF THE CONTENT OF SUCH CONTAINED THEREIN

| Sample | % by Stearin | Degree of Hygroscopicity | Resistance to Caking at 110° F. Storage | Melting Point Range °F. |
|---|---|---|---|---|
| Emplex | 0 | Extreme | Extremely poor | 115.3 to 117.5 |
| SS2L (lab) | 0 | Extreme | Extremely poor | 118.4 to 122.7 |
| SS2L (lab) | 2.5 | Slight to moderate | Good | 138.6 to 151.9 |
| SS2L (lab) | 10.0 | Slight | Very good | 137.0 to 149.6 |
| SS2L (lab) | 30.0 | Very slight | Very good | 137.5 to 148.6 |

The data of Table I demonstrates that the subjective and objective physical properties tested are essentially equivalent for the commercial sodium stearoyl-2-lactylate (Emplex) and the laboratory preparation of the same without hydrogenated soybean oil stearin addition. The data most importantly also show the dramatic improvement in all physical properties tested with the inclusion of hydrogenated soybean oil stearin into the reaction ingredients during production of the sodium stearoyl-2-lactylate. As little an amount of hydrogenated soybean oil stearin as 2.5% by weight surprisingly increased the melting point of the lactylate salt and significantly improved hygroscopicity and resistance to caking at elevated temperatures. The improvements approached a maximum at about 30% by weight addition of such soybean oil stearin.

The mechanism by which the stearin improves the physical qualities is not understood, however, it is suggested that a portion of the improvement, especially in melting point range may be due to some form of microincapsulation of the lactylate salt by the stearin.

EXAMPLE II

Sodium stearoyl-2-lactylate was prepared in the laboratory by conventional means except that after production various samples, while still molten had hydrogenated soybean oil stearin added and mixed therein in the amounts of 2.5%, 10% and 30% (by weight). These samples were compared to the laboratory lactylate salt with no oil additions and to the commercial salt (Emplex) by testing according to the previously described procedure. The resulting data are recorded in Table II.

TABLE II
COMPARISON OF THE PHYSICAL PROPERTIES OF SODIUM STEAROYL-2-LACTYLATE WITHOUT AND WITH CO-MELTED HYDROGENATED SOYBEAN OIL STEARIN

| Sample | % by weight Stearin | Degree of Hygroscopicity | Resistance to Caking at 110° F. Storage | Melting Point Range °F. |
|---|---|---|---|---|
| Emplex | 0 | Extreme | Extremely poor | 115.3 to 117.5 |
| SS2L (lab) | 0 | Extreme | Extremely poor | 118.4 to 122.7 |
| SS2L (lab) | 2.5 | Slight to moderate | Good | 139.5 to 150.7 |
| SS2L (lab) | 10.0 | Slight | Very good | 139.0 to 150.0 |
| SS2L (lab) | 30.0 | Slight | Very good | 138.7 to 149.9 |

The data in Table II demonstrate the functionality of co-melting hydrogenated soybean oil stearin with completed lactylate salts, and in particular sodium stearoyl-2-lactylate to improve physical properties. As in the previous example, it appeared that small amounts of such stearin (here 2.5% by weight) produced many of the physical properties desired and greater amounts (between 10% and 30% by weight) tended to improve such properties at a lesser rate.

EXAMPLE III

To show functionality of the invention with non-sodium stearoy lactylates, calcium stearoyl-2-lactylate (CS2L) was prepared by a conventional method and compared with a commercial calcium stearoyl-2-lactylate (Verv Ca marketed by C. J. Patterson Co.) by testing as previously described. Samples of the lactylate salt were also prepared by conventional means except 2.5% and 30% (by weight) of hydrogenated soybean oil stearin was added and mixed with respective samples during production. Additional samples of the completed molten lactylate salt were mixed with hydrogenated soybean oil stearin where such stearin was present in amounts of 2.5% and 30% (by weight). All samples were powdered and tested as previously described and the results recorded in Table III.

TABLE III
COMPARISON OF THE PHYSICAL PROPERTIES OF CALCIUM STEAROYL-2 LACTYLATE WITHOUT AND WITH HYDROGENATED SOYBEAN OIL STEARIN BOTH THERMALLY CO-MIXED AND CO-MELTED AS A FUNCTION OF INCREASING STEARIN CONTENT

| Sample | % by weight Stearin | When Stearin Added | Degree of Hygroscopicity | Resistance to Caking at 110° F. Storage | Melting Point Range °F. |
|---|---|---|---|---|---|
| Verv Ca | 0 | — | High | Poor to moderate | 115.6 to 116.5 |
| CS2L (lab) | 0 | — | High | Poor to moderate | 114.4 to 116.2 |
| CS2L (lab) | 2.5 | during production (co-mixed) | Slight | Very good | 126.1 to 136.6 |
| CS2L (lab) | 30.0 | during production (co-mixed) | Very slight | Extremely good | 130.6 to 136.6 |
| CS2L (lab) | 2.5 | after production (co-melted) | Slight | Very good | 127.5 to 136.2 |
| CS2L (lab) | 30.0 | after | Very | Extremely | 129.7 to 136.5 |

TABLE III-continued
COMPARISON OF THE PHYSICAL PROPERTIES OF CALCIUM STEAROYL-2 LACTYLATE WITHOUT AND WITH HYDROGENATED SOYBEAN OIL STEARIN BOTH THERMALLY CO-MIXED AND CO-MELTED AS A FUNCTION OF INCREASING STEARIN CONTENT

| Sample | % by weight Stearin | When Stearin Added | Degree of Hygroscopicity | Resistance to Caking at 110° F. Storage | Melting Point Range °F. |
|---|---|---|---|---|---|
| | | production (co-melted) | slight | good | |

The test data demonstrate the functionality of the present invention in improving the physical properties of calcium stearoyl-2-lactylate where hydrogenated soybean oil stearin is added both to the lactylate salt during production and to the remelted salt after production. It should be noted that the laboratory prepared salt had physical properties essentially identical to the commercial salt (Verv Ca).

It seems apparent that some improvements in physical properties can be obtained by addition of hydrogenated stearin to any of the edible stearoyl lactylate salts of the metals from the alkali or alkaline earth groups, not specifically mentioned herein, and in particular potassium.

EXAMPLE IV

Mixed stearoyl-2-lactylate salts were tested to show the functionality of the invention. The salts were prepared using various combinations of sodium and calcium stearoyl-2-lactylate as shown in Table IV. Hydrogenated soybean oil stearin was added to some of the salts also as shown in Table IV. All samples were powdered and tested as previously described and the results tabulated in Table IV.

As used in Examples IV and VI, the term co-reaction, when pertaining to the production of mixed sodium and calcium stearoyl lactylate salts is understood to mean that the sodium hydroxide and calcium hydroxide (or calcium carbonate) are added to the lactylate acid simultaneously during production of such lactylate salts, whereby the equivalence ratio of sodium to calcium in the finished salt composition is a particular value. In all of the samples in Table IV and Table VI the equivalence ration was 1:1. An equivalence ratio of 1:1 means that about 23 weight units of sodium would be present in the completed product for every 20 weight units of calcium. In Example IV, when pertaining to the production of mixed sodium and calcium stearoyl lactylate salts, the term joint-melted is understood to mean that the sodium and calcium stearoyl-2-lactylates are produced separately and then mixed together at some later time while molten. The salts may be so mixed after production or remelted from a solid state and mixed. The joint-melted samples 6 through 12 in Table IV were all mixed together following production of the individual salts, while still molten.

TABLE IV
COMPARISON OF THE PHYSICAL PROPERTIES OF MIXED SALT SODIUM-CALCIUM STEAROYL-2-LACTYLATES WITHOUT AND WITH HYDROGENATED SOYBEAN OIL STEARIN ADDITION AND AS A FUNCTION OF CONTENT THEREOF

| Sample | Description of Order of Addition of Additives | % by weight Stearin | Degree of Hygroscopicity | Resistance to Caking at 110° F. Storage | Melting Point Range °F. |
|---|---|---|---|---|---|
| 1 | Sodium and calcium stearoyl-2-lactylates are co-reacted. Stearin added by co-mixing during co-reaction. | 0 | Moderate | Poor | 112.3 to 115.3 |
| 2 | | 2.5 | Slight | Good | 122.7 to 133.0 |
| 3 | | 30.0 | Very slight | Very good | 133.2 to 135.9 |
| 4 | Sodium and calcium stearoyl-2-lactylates are co-reacted. Stearin added by co-melting after co-reaction of salts while same are still molten | 2.5 | Slight | Good | 123.2 to 132.9 |
| 5 | | 30.0 | Very slight | Very good | 132.8 to 135.5 |
| 6 | Sodium and calcium stearoyl-2-lactylates are produced separately and then mixed together by joint-melting. Stearin added by co-melting after joint-melting of salts. | 0 | Moderate to high | Poor to fair | 114.9 to 117.6 |
| 7 | | 2.5 | Slight | Good | 124.0 to 134.3 |
| 8 | | 30.0 | Very slight | Very good | 123.9 to 133.8 |
| 9 | Sodium and calcium stearoyl-2-lactylates are produced separately and then mixed together by joint-melting. Stearin added during production by co-mixing with each individual salt. | 2.5 | Slight | Good | 122.3 to 133.0 |
| 10 | | 30.0 | Slight | Good | 123.5 to 132.8 |
| 11 | Sodium and calcium stearoyl-2-lactylates are produced separately and then mixed together by joint-melting. Stearin added after production of individual salt by co-melting while salts are still molted but before salts are mixed together. | 2.5 | Very slight | Very good | 133.5 to 136.2 |
| 12 | | 30.0 | Very slight | Very good | 132.7 to 136.0 |

The data of Table IV demonstrate the functionality of the invention when used with mixed stearoyl-2-lactylate salts. In each mixed salt combination, with hydrogenated soybean oil stearin added therein, the physical properties of the mixture improved significantly over those mixtures without stearin additions.

It seems apparent that other mixtures of the salts, for example, wherein the equivalence ratio of sodium to calcium is 3:2 or 2:3, would also have improved properties. It also seems apparent that other methods of addition of the stearin would be functional, for instance, where the stearin is added by co-mixing with the sodium salt during production, the stearin is added to the calcium salt by co-melting after production, and then both salts are co-melted. Also, part of the stearin could be added at one point in the process and the remainder at another point.

EXAMPLE V

The preceeding examples demonstrated the functionality of the invention using fully hydrogenated soybean oil stearin which contains about 90% (by weight of fatty acid) $C_{18}$ fatty acid. This example demonstrates the functionality of stearin containing less than 90% (by weight of fatty acid) $C_{18}$ fatty acid.

Palm oil stearin used for Examples V and VI comprised fully hydrogenated oil stearin which was about 50% (by weight of fatty acid) $C_{18}$ fatty acid and had a melting point range of 138.9° to 142.0° F.

Samples of commercial grade (Emplex) and laboratory prepared sodium stearoyl-2-lactylates as previously described were compared to laboratory preparations wherein hydrogenated palm oil stearin was added to the salt during production by co-mixing and after production of the salt by co-melting as shown in Table V. The salts were powdered and tested as previously described with the results tabulated in Table V.

TABLE V

COMPARISON OF THE PHYSICAL PROPERTIES OF SODIUM STEAROYL-2 LACTYLATE WITH AND WITHOUT PALM OIL STEARIN

| Sample | When Stearin Added | % by Weight Stearin | Degree of Hygroscopicity | Resistance to Caking at 110° F. Storage | Melting Point Range °F. |
|---|---|---|---|---|---|
| Emplex | — | 0 | Extreme | Extremely poor | 115.3 to 117.5 |
| SS2L (lab) | — | 0 | Extreme | Extremely poor | 118.4 to 122.7 |
| SS2L (lab) | during production of salt (co-mixed) | 2.5 | Slight | Fair | 130.5 to 145.9 |
| SS2L (lab) | during production of salt (co-mixed) | 30.0 | Very slight | Good | 136.2 to 143.4 |
| SS2L (lab) | after production of salt (co-melted) | 2.5 | Slight | Fair | 131.4 to 117.0 |
| SS2L (lab) | after production of salt (co-melted) | 30.0 | Very slight | Good | 135.4 to 143.0 |

The data demonstrate that hydrogenated palm oil stearin having about 50% (by weight of fatty acid) $C_{18}$ fatty acid is functional in the invention. However, the results of this example when compared to Example I show a desirability for the stearin which is 90% (by weight of fatty acid) $C_{18}$ fatty acid.

It seems apparent that other stearins would be functional if they are at least 50% (by weight of fatty acid) $C_{18}$ fatty acid and are fully hydrogenated, in particular cottonseed oil stearin.

EXAMPLE VI

Calcium stearoyl-2-lactylate was produced by a conventional method. A second calcium stearoyl-2-lactylate was produced by the same conventional method except 2.5% (by weight) of hydrogenated palm oil stearin was added by co-mixing during production of the salt. A co-reacted composition of sodium and calcium stearoyl-2-lactylate, wherein the equivalence ratio of sodium to calcium was 1:1, was produced along with a like composition, except 2.5% (by weight) of hydrogenated palm oil stearin was added by co-mixing during production. All four samples were powdered and tested as previously described with the results tabulated in Table VI.

TABLE VI

COMPARISON OF THE PHYSICAL PROPERTIES OF CALCIUM STEAROYL-2 LACTYLATE AND MIXED SALT SODIUM-CALCIUM STEAROYL-2 LACTYLATE WITHOUT AND WITH HYDROGENATED PALM OIL STEARIN AND AS A FUNCTION OF CONTENT THEREOF

| Sample | When Stearin Added | % by weight Stearin | Degree of Hygroscopicity | Resistance to Caking at 110° F. Storage | Melting Point Range °F. |
|---|---|---|---|---|---|
| | — | 0 | High | Poor to moderate | 114.4 to 116.2 |
| CS2L (lab) | during production (co-mixed) | 2.5 | Slight | Very good | 124.2 to 134.6 |
| Co-reacted sodium and calcium stearoyl- | during production (co-mixed) | 0 | Moderate | Poor | 112.3 to 115.3 |

TABLE VI-continued
COMPARISON OF THE PHYSICAL PROPERTIES OF CALCIUM STEAROYL-2 LACTYLATE AND MIXED SALT SODIUM-CALCIUM STEAROYL-2 LACTYLATE WITHOUT AND WITH HYDROGENATED PALM OIL STEARIN AND AS A FUNCTION OF CONTENT THEREOF

| Sample | When Stearin Added | % by weight Stearin | Degree of Hygroscopicity | Resistance to Caking at 110° F. Storage | Melting Point Range °F. |
|---|---|---|---|---|---|
| 2-lactylate with a 1:1 sodium to calcium equivalence ratio | | 2.5 | Slight | Good | 123.8 to 131.8 |

The data of Table VI demonstrate the functionality of using hydrogenated palm oil stearin in calcium stearoyl-2-lactylate and in mixed salt compositions of sodium and calcium wherein the equivalence ratio of sodium to calcium is 1:1.

It seems apparent that the use of the invention in mixed salts of other equivalence ratios of sodium to calcium such as 3:2 or 2:3 would also be functional.

It also seems apparent that lactylate salts having polylactyl groups of more or less than 2 would be functional with the invention, such as sodium stearoyl-1-lactylate or calcium stearoyl-3-lactylate.

It additionally seems apparent that palm oil stearin would be functional in improving the physical properties of non-sodium and calcium lactylate salts, in particular potassium stearoyl lactylates.

It is to be understood that while certain forms of this invention have been described; it is not to be limited thereto, except insofar as such limitations are included in the following claims.

Having thus described the invention, what is claimed and desired to secure by Letters Patent is:

1. A process for production of low hygroscopicity and high melting point stearoyl lactylate salt compositions comprising the steps of:
   (a) manufacturing a stearoyl lactylate salt selected from the group consisting of sodium stearoyl lactylate calcium stearoyl lactylate and mixtures thereof;
   (b) adding hydrogenated stearin with an iodine value of less than about 7 thereto, such that from about 2 to about 30 parts of said stearin are added for each 70 to 98 parts of said salt; wherein all fatty acid radicals on said stearin are in the range of 50% to 100% (by weight of fatty acid) of at least $C_{18}$ fatty acid;
   (c) mixing together said stearin and said salt while said salt is in a molten state;
   (d) cooling said composition after thermally mixing; and
   (e) powdering said cooled composition.

* * * * *